US005995260A

United States Patent [19]
Rabe

[11] Patent Number: 5,995,260
[45] Date of Patent: Nov. 30, 1999

[54] SOUND TRANSDUCER AND METHOD HAVING LIGHT DETECTOR FOR DETECTING DISPLACEMENT OF TRANSDUCER DIAPHRAGM

[75] Inventor: Karl W. Rabe, Chapel Hill, N.C.

[73] Assignee: Ericsson Inc., Research Triangle Park, N.C.

[21] Appl. No.: 08/853,084

[22] Filed: May 8, 1997

[51] Int. Cl.[6] ........ H04B 10/02
[52] U.S. Cl. ........ 359/150; 381/172
[58] Field of Search ........ 359/149–150, 359/169–170; 381/172

[56] References Cited

U.S. PATENT DOCUMENTS

| | | | |
|---|---|---|---|
| 3,286,032 | 11/1966 | Baum | 359/150 |
| 4,016,556 | 4/1977 | Fulenwider | 381/172 |
| 4,224,482 | 9/1980 | Lese et al. | 381/172 |
| 4,422,182 | 12/1983 | Kenjyo | 359/150 |
| 5,262,884 | 11/1993 | Buchholz | 359/150 |
| 5,333,205 | 7/1994 | Bogut et al. | 381/172 |

FOREIGN PATENT DOCUMENTS

| | | | |
|---|---|---|---|
| 2051 215 | 4/1972 | Germany . | |
| 195 08 284 A1 | 1/1996 | Germany . | |
| 60-123197 | 7/1985 | Japan . | |
| 0260400 | 10/1988 | Japan | 381/172 |
| 2161341 | 1/1986 | United Kingdom | 381/172 |

OTHER PUBLICATIONS

Standard Search Report for RS 100280 US Completed on Apr. 21, 1998, Apr. 23, 1998, EPX.

*Primary Examiner*—Kinfe-Michael Negash
*Attorney, Agent, or Firm*—Jenkens & Gilchrist, P.C.

[57] ABSTRACT

Transducer circuitry, and an associated method, converts acoustic signals into electrical signals. The transducer circuitry includes a diaphragm which is positioned to receive acoustic signals, such as voice signals. Displacement of the diaphragm responsive to reception of the acoustic signals is detected by directing light energy towards the diaphragm and detecting characteristics of the light energy reflected off of the diaphragm. Changes in the characteristics of the light energy are determinative of the displacement of the diaphragm and, in turn, values of the acoustic signals received by the diaphragm. When embodied in a radiotelephonic device, the diaphragm can be positioned at a location best to detect voice signals generated by a user without the need to position electrical leads to extend to the diaphragm, or a winding positioned thereabout, to detect displacement of the diaphragm.

17 Claims, 3 Drawing Sheets

SOUND TRANSDUCER AND METHOD HAVING LIGHT DETECTOR FOR DETECTING DISPLACEMENT OF TRANSDUCER DIAPHRAGM

The present invention relates generally to sound transducers utilized together with transmitter circuitry, such as the transmitter portion of a radiotelephonic device. More particularly, the present invention relates to transducer circuitry, and an associated method, having a transducer diaphragm, such as an electret membrane, which is displaceable responsive to a voice signal, or other acoustic signal. Displacement of the diaphragm is detected by directing a light beam upon the diaphragm and measuring characteristics of the reflected light.

Because light energy is used to detect displacement of the transducer diaphragm, an electrical connection extending to the diaphragm or to a microphone capsule is not required. When embodied in a telephonic handset, such as a portion of a radiotelephonic device, the diaphragm of the transducer can be positioned to best detect voice signals generated by a user when the user speaks into the handset. As electrical leads extending to the transducer are not required to detect displacement of the diaphragm, problems associated with the need to use electrical leads extending to a conventional transducer are avoided. The diaphragm can, for instance, be positioned in a flip portion of the handset without concern that electrical leads extending thereto might break after repeated opening and closing of the flip portion or that radio frequency interference might be induced upon the electrical leads. Also, radio frequency interference generated during operation of the handset is not induced upon electrical leads as light energy is instead used to detect displacement of the transducer diaphragm.

BACKGROUND OF THE INVENTION

A communication system is comprised, at a minimum, of a transmitter and a receiver interconnected by a communication channel. The transmitter is operative to transmit communication signals generated at, or applied to, the transmitter upon the communication channel so that the receiver can detect the transmitted signals. To transmit the communication signals upon the communication channel, the transmitter must convert the signals into a form to permit their transmission upon the communication channel.

In a two-way communication system, transmitter and receiver pairs form communication stations through which communication signals can both be transmitted and received. Because of such capability both to transmit and to receive communication signals, two-way communication can be effectuated at such a communication station.

A radio communication system is a communication system in which the communication channel is formed of a radio frequency communication channel. The radio frequency communication channel is formed of a range of frequencies of the electromagnetic frequency spectrum. The transmitter, i.e., a radio transmitter, of a radio communication system converts a communication signal generated at, or applied to, the radio transmitter into a form permitting its transmission upon the radio frequency channel. The receiver, i.e., a radio receiver, operable in a radio communication system is tuned to the radio frequency channel upon which the radio transmitter transmits the communication signal. When so-transmitted, the radio receiver can receive the transmitted signal.

Radio transceiver circuitry, formed of both radio transmitter and radio receiver portions, permit two-way communications to be effectuated. Two-way communication is effectuated between a remotely-positioned radio transceiver by communicating transmit and receive signals upon one or more radio communication channels.

A radio communication system is advantageous for the reason that fixed connections, such as wirelines or cables, are not required to form the communication channel which interconnects the radio transmitter and radio receiver. Utilization of a radio communication system is, therefore, particularly advantageous when a fixed connection interconnecting a transmitter and a receiver would be inconvenient or impractical.

By utilizing transmitters capable of generating a communication signal of high signal strength and utilizing a radio receiver of a high sensitivity, the transmitter and receiver can be separated by a significant separation distance while still permitting adequate communication of the transmitted signal by the radio transmitter to the radio receiver.

A cellular communication system is exemplary of a radio communication system. Cellular communication networks which form the infrastructure of cellular communication systems have been installed throughout significant portions of the world and large numbers of subscribers to such cellular networks are able to communicate telephonically when positioned in areas encompassed by such cellular networks.

Utilization of a cellular communication system is advantageous as a user can communicate pursuant to the communication system by way of a radiotelephonic device, i.e., "cellular phone" or "subscriber unit", positioned anywhere throughout the geographical area encompassed by the network. As wireline connections are not required to effectuate communication, telephonic communication can be effectuated by a user, e.g., when traveling in a motor vehicle or in other situations in which communication by way of a communication system requiring the use of a fixed connection between the transmitter and receiver would be inconvenient or impractical.

Other types of wireless communication systems similarly are advantageously utilized as fixed connections between a radio transmitter and radio receiver are not required to effectuate communication therebetween. Transceivers analogous to the radiotelephonic devices utilized in a cellular communication system are similarly utilized to effectuate communications in other types of radio communication systems.

Advancements in communication technologies have permitted the portability of the radiotelephonic devices utilized in such radio communication systems to be increased. As electrical circuitry becomes increasingly miniaturized, the volumetric requirements of electronic devices including such circuitry are permitted to be reduced.

Radiotelephonic devices are exemplary of electronic devices which have been constructed to be of increasingly smaller sizes and weights. Commercially-available radiotelephonic devices operable in various cellular communication systems are now of weights of only several ounces and are of dimensions of only a few cubic inches. A radiotelephonic device conventionally includes a speaker to permit a user of the device to listen to signals transmitted to the device and a microphone to receive voice, or other, signals generated by the user. A housing is used to support the circuitry of the radiotelephonic device, including the speaker and microphone. The speaker and microphone are typically supported at opposite side portions of the housing to permit concurrent positioning of the speaker proximate to the user's ear and the microphone proximate to the user's mouth. When the radiotelephonic device is operated the user is able to concurrently listen to signals generated at the speaker and to speak into the microphone.

A speaker is a transducer which coverts electrical energy into mechanical energy, and a microphone is a transducer which converts mechanical (e.g., aural) energy into electrical energy. A microphone typically includes a diaphragm which vibrates upon the application of aural energy thereto. In some microphones, an electrical winding is positioned proximate to the diaphragm and vibrations of the diaphragm induce currents in the winding. Other microphones are formed of electrets which include an electret membrane and an electrical circuit coupled thereto. As a result of the aforementioned circuit miniaturization, the circuitry of a radiotelephonic device can now be housed within a housing of much-reduced lengthwise dimensions. The circuitry of the radiotelephonic device can be housed in a housing of lengthwise dimensions which, when the speaker supported at one end side of the housing is positioned proximate to the user's ear, the microphone supported at an opposing end side of the housing cannot be positioned immediately proximate to the user's mouth.

By selecting a microphone of appropriate "pick-up" characteristics, the microphone is still able to detect adequately the voice signal generated by the user. However, when the microphone is not positioned immediately proximate to the user's mouth, additional amounts of background noise are also detected by the microphone.

The background noise together with the voice signal are modulated by circuitry of the radiotelephone and then transmitted. Such background noise reduces the quality of the signal communicated by the radiotelephone. That is to say, the signal-to-noise ratio of the transmitted signal is reduced as the noise component becomes a relatively larger portion of the signal transmitted by the radiotelephone. With additional reductions in the lengthwise dimensions of the radiotelephone and resultant positioning of the microphone farther away from the user's mouth, the problems associated with background noise become more significant.

Some constructions of radiotelephones include a flip portion which is rotatably coupled to a main housing portion of the radiotelephonic device. The flip portion can be rotated into an open position to form an extension extending beyond an end portion of the main housing portion. A microphone positioned at the flip portion of the radiotelephonic device can be positioned closer to the user's mouth than when positioned at the main housing portion. By positioning the microphone at the flip portion, such that the microphone can be positioned closer to the user's mouth, the signal-to-noise ratio of a voice signal generated by the user relative to background noise can be increased, thereby facilitating communications of improved quality.

Some other constructions of radiotelephones include a slidable arm which is slidably coupled to a main housing portion of the radiotelephonic device. Such a slidable arm is operable in manners analogous to that of the rotatable flip portion to position a microphone closer to the user's mouth.

Positioning of the microphone at the flip portion or upon a slidable arm, however, requires electrical leads to couple the microphone with the transmitter circuitry of the radiotelephonic device to extend through a rotatable coupling which rotatably couples the flip portion to the main housing portion. After repeated rotation of the flip portion, such leads are susceptible to breakage. More elaborate connectors can be utilized, such as a swivel connector to interconnect the microphone and the transmitter circuitry of the radiotelephonic device, but such connectors are relatively costly. Additionally, such connectors are sometimes also susceptible to radio frequency interference which sometimes results in "motorboating" sounds, and rubbing together of such connectors can also result in the generation of electrical noise. Such sounds also degrade the quality of communications effectuated pursuant to the radiotelephonic device.

In some other constructions of radiotelephonic devices, a flip portion is also utilized, but the microphone is mounted within the main housing portion of the radiotelephonic device. In such constructions, the flip or slidable arm portion, used primarily for aesthetic reasons, also serves, to some extent, to reflect voice signals generated by the user towards the microphone.

As the physical dimensions of radiotelephonic devices continue to decrease, it shall likely become increasingly difficult to limit pick-up of background noise if the microphone must be positioned increasingly farther away from the user's mouth. What is needed, therefore, is a manner by which to permit positioning of a microphone close to the user's mouth without requiring electrical leads to extend to the diaphragm.

It is in light of this background information related to transducer circuitry, such as that used in radiotelephonic devices, that the significant improvements of the present invention have evolved.

SUMMARY OF THE INVENTION

The present invention advantageously provides transducer circuitry having a diaphragm positionable proximate to a source of an acoustic signal, such as a voice signal. Because the diaphragm is positionable proximate to the acoustic signal source, vibrations induced upon the diaphragm are primarily caused by the acoustic source and not background noise. A signal resultant therefrom is advantageously of a high signal-to-noise ratio.

Displacement of the diaphragm is detected by detecting light energy reflected off of the diaphragm. Because characteristics of light energy reflected off of the diaphragm are utilized to detect the displacement of the diaphragm, electrical leads are not required to extend to a transducer diaphragm. The transducer circuitry can thereby be positioned proximate to a source of an acoustic signal while not requiring electrical leads to extend to the diaphragm. Signals representative of the levels of displacement of the diaphragm responsive to the acoustic signal can be generated remote from the diaphragm.

When embodied in a telephonic handset, such as a portable radiotelephonic device, the diaphragm can be positioned at a location best to detect voice signals generated by a user when the user speaks into the telephonic handset. As electrical leads extending to the diaphragm are not required to detect displacement of the diaphragm, problems associated with the use of electrical leads extending to the transducer diaphragm are avoided. The diaphragm can be positioned in a flip portion of the handset without concern that the electrical leads might break after repeated opening and closing of the flip or that electromechanical interference might be induced upon the electrical leads. Also, because electrical leads are not required to extend to the diaphragm, radio frequency interference resulting from radio frequency interference induced upon such leads are avoided.

For the same reasons, the diaphragm of the transducer circuitry can also be mounted proximate to a face surface of the radiotelephonic housing of the radiotelephonic device without concern for electrical leads extending thereto. Radio frequency interference, such as that formed during operation of other circuit portions of the radiotelephonic device, are not superimposed upon signals representative of the acoustic signals detected by the diaphragm as leads are not needed to extend to the diaphragm.

In accordance with these and other aspects, therefore, transducer circuitry, and an associated method, converts an acoustic signal into an electrical signal. A diaphragm is positioned to receive the acoustic signal. The diaphragm has a face surface formed of a reflective material, and at least the face surface of the diaphragm is displaceable by displacement distances responsive to levels of the acoustic signal detected thereat. A light transmitter is positioned to direct an incident light beam towards the diaphragm. The incident light beam is incident upon the face surface of the diaphragm at a location thereof and at an angle incident thereto dependent upon the displacement distances at which the diaphragm is displaced. A light detector is positioned to detect a reflected light beam reflected off of the diaphragm. The reflected light beam is of characteristics responsive to the location upon the face surface of the diaphragm and the angle incident thereto at which the incident light beam is incident. The light detector generates the electrical signal of values responsive to detected characteristics of the reflected light beam.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION

Figure 1:
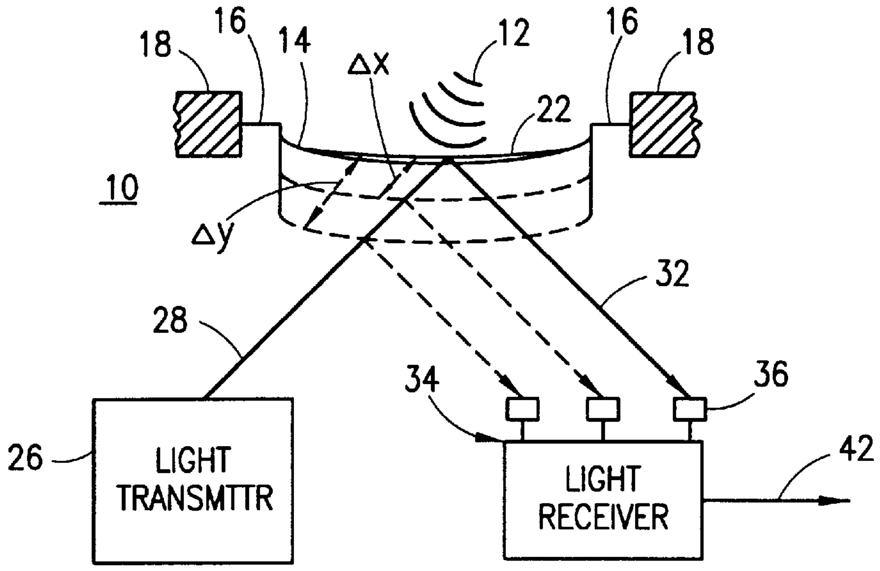
FIG. 1 illustrates a functional, block diagram of the transducer circuitry of an embodiment of the present invention operative to convert acoustic signals into electrical signals.

FIG. 1 illustrates the transducer circuitry, shown generally at 10, of an embodiment of the present invention. The transducer circuitry 10 is operative to convert acoustic signals, here signals 12 into electrical form. The transducer circuitry 10 does not require leads extending to a diaphragm or to an electret, conventionally required of circuitry including such devices.

In conventional transducer circuitry utilizing a diaphragm, currents are induced responsive to mechanical movement of the diaphragm. In such conventional transducer circuitry, the diaphragm is positioned to receive acoustic signals and to be displaced responsive thereto. Electrical current is responsive to the mechanical displacement in electrical leads. Such leads are connected, for instance, to transmitter circuitry which generates signals responsive to the electrical signals supplied thereto.

In conventional transducer circuitry utilizing an electret, an electret membrane is positioned proximate to a gate electrode of a MOSFET (metal oxide semiconductor field effect transistor). The electret membrane is charged, and movement of the membrane changes the electrical characteristics of the MOSFET. Leads are connected to the MOSFET and also, for instance, to transmitter circuitry.

The transducer circuitry 10 illustrated in FIG. 1 also includes a diaphragm, here diaphragm 14, positioned to receive the acoustic signals 12. The diaphragm is physically displaceable by displacement distances responsive to magnitudes of the acoustic signals 12. The diaphragm 14 is supported in position by a bracket 16 positioned about the diaphragm. The bracket 16 is here illustrated to be fixedly attached to fixed supports 18.

When the acoustic signals 12 are received at the diaphragm 14, the diaphragm is displaced by displacement distances proportional to the magnitude of the acoustic signal. For purposes of illustration, FIG. 1 illustrates the diaphragm 14 displaced by a first displacement distance, $\Delta x$, and a second displacement distance, indicated by $\Delta y$. The positioning of the diaphragm 14 when displaced by the two exemplary displacement distances are indicated by the dashed lines in the figure.

At least portions, here portions 22, of the diaphragm 14 are formed of a light reflective material. The light reflective material of which the portions 22 are formed reflect light incident upon the surfaces of such portions 22.

The transducer circuitry 10 includes a light transmitter 26 which is operative to direct light energy towards the diaphragm 14 to be incident thereupon. The light generated by the light transmitter is indicated in the figure by a light beam 28 which is incident at an incident angle upon the portion 22 of the diaphragm 14. For purposes of illustration, the light energy of the light generated by the transmitter 26 is indicated to form the light beam 28 which is directed towards the diaphragm. The light beam 28 is also representative of the location of maximum energy of a wavefront of light energy directed towards the diaphragm.

Because the portion 22 is light-reflective, the light beam 28 incident upon the portion 22 is reflected therefrom. The reflected light energy, here represented by a reflected light beam 32, is reflected off of the portion 22 at an angle corresponding to the angle at which the incident light beam 28 is incident upon the light-reflective portion 22 and the location of incidence of the incident light beam thereupon.

For purposes of illustration, light reflected off of the portion 22 of the diaphragm 14 when the diaphragm is displaced by the displacement distances $\Delta x$ and $\Delta y$ is also illustrated in the figure. Similar such reflected light paths can be shown for other distances of displacement of the diaphragm 14.

A light receiver 34 is positioned to detect light reflected off of the light-reflective portion 22 of the diaphragm 14. The characteristics of the light energy received by the light receiver 34 is dependent upon the position of the diaphragm 14 when the light beam 28 is incident thereupon.

In the exemplary embodiment of FIG. 1, the light receiver 34 includes an array of light sensors 36 positioned at spaced-apart locations. The characteristics of the light energy reflected off of the diaphragm 14 and sensed by the sensors 36 is dependent upon the position of the diaphragm 14 when the incident light beam 28 strikes the diaphragm. For instance, the right-most (as shown) light sensor 36 detects the greatest level of light energy when the diaphragm 14 is not displaced. The middle-positioned (as illustrated) and left-most (as illustrated) light sensors 36 detect greatest levels of light energy when the diaphragm 14 is displaced by distances Δx and Δy, respectively. The light receiver 34 is operative responsive to such detection by the light sensors of the light energy to generate a signal on line 42 representative thereof.

The phase of the light energy reflected off of the reflective portion 22 is similarly dependent upon the position of the diaphragm and can similarly be detected and utilized to form the signal on line 42.

Also, while the illustrated embodiment includes an array of light sensors 36, the light receiver 34 may alternately include a single light sensor 36. Characteristics of the light energy detected by the single sensor 36 is utilized to form the electrical signal generated on the line 42. Displacement of the diaphragm 14 causes the characteristics of the light energy detected by the single sensor 36 to vary. The electrical signal generated on the line 42 responsive thereto is representative of such variations of the characteristics of the light energy detected by the sensor.

Figure 2:
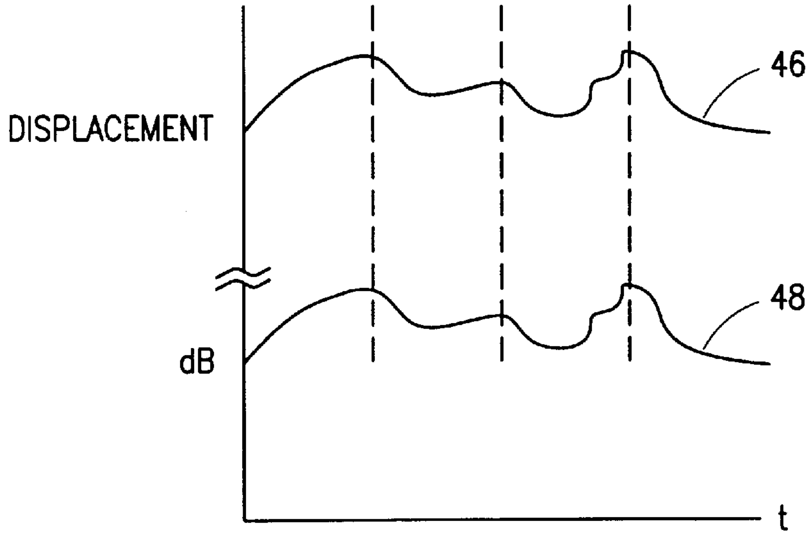
FIG. 2 illustrates graphical representations of an acoustic signal applied to the transducer circuitry shown in FIG. 1 and the corresponding electrical signal generated by the transducer circuitry.

FIG. 2 illustrates the relationship between the acoustic signal 12 applied to the transducer circuitry 10, shown in FIG. 1, and the electrical signal generated on line 42 by the transducer circuitry 10. The waveform 46 illustrated in the Figure is a plot of the magnitude of the acoustic signal 12, and the corresponding displacement of the diaphragm 14, plotted as a function of time. With changes in the magnitude of the acoustic signal, e.g., changes in the intensity levels of a voice signal generated by a speaker speaking into the diaphragm 14 of the transducer circuitry 10, the magnitude of such signal varies.

Light energy generated by the light transmitter 26 of the transducer circuitry 10 is directed towards the reflective portion 22 of the diaphragm 14 to be reflected therefrom. Light energy reflected off of the portion 22 of the diaphragm towards the light receiver 34 is detected by the one or more light sensors 36 thereof.

Responsive to detection of the reflected light energy, the light receiver 34 generates electrical signals on the line 42; such signals are represented graphically in FIG. 2 by the waveform 48. The waveform 48 is formed of a plot of the magnitude of the electrical signal formed as a function of time. Comparison of the waveforms 48 and 46 indicates that the electrical signal generated by the light receiver 34 is representative also of corresponding portions of the acoustic signal 12. The transducer circuitry 10 is thereby operable to convert the acoustic signal 12 into electrical form.

Figure 3:
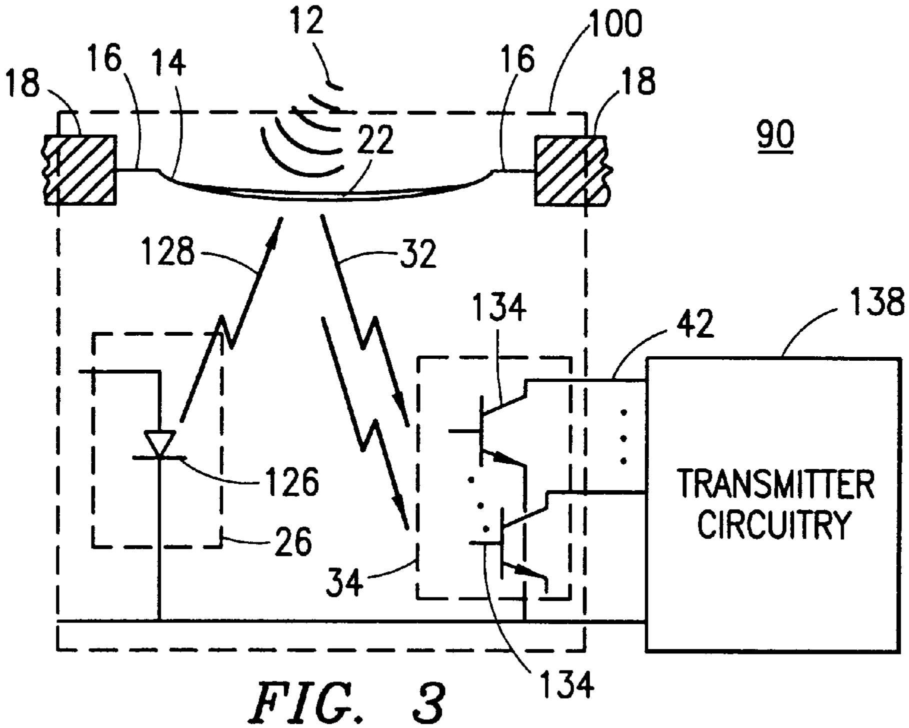
FIG. 3 illustrates a partial, functional block, partial circuit schematic diagram of a radio transmitter which includes the transducer circuitry shown in functional block 1 in FIG. 1 as a portion thereof.

FIG. 3 illustrates a transmitter, shown generally at 90, of an embodiment of the present invention. The transmitter 90 may, for example, form the transmitter portion of a radiotelephonic device. The transmitter 90 includes transducer circuitry 100, analogous to the transducer circuitry 10 shown in FIG. 1. The transducer circuitry 100 is also operative to convert an acoustic signal into electrical form. Transmit signals generated by the transmitter 90 are representative of the electrical signals generated by the transducer circuitry 100, once converted into a form suitable for transmission upon a communication channel. For purposes of illustration, portions of the transducer circuitry 100 which correspond with portions of the transducer circuitry 10 shown in FIG. 1 shall be like-numbered.

Accordingly, acoustic signals 12, such as voice signals generated by a speaker when speaking into the transducer circuitry 100 is received at a diaphragm 14. The acoustic signals 12 cause displacement of the diaphragm as described previously to the diaphragm 14 of transducer circuitry 10 shown in FIG. 1. The diaphragm 14 is again shown to be supported in position by a bracket 16 which is affixed to a fixed support, here the housing 118 of the transmitter. The diaphragm 14 is also again shown to include a light reflective portion 22.

The transducer circuitry 100 also again includes a light transmitter 26, here formed of an infrared, light emitting diode (LED) 126. Infrared light energy 128 generated by the LED 126 is directed toward the diaphragm 14 and the infrared-reflective portion 22 thereof.

Light energy reflected off of the reflective portion 22 includes reflected portions which are reflected toward a light receiver 34. Here, the light receiver is shown to be formed of a plurality of phototransistors having electrical characteristics responsive to levels of infrared energy reflected off of the reflective portion and received by the phototransistors 134. The phototransistors 134 are coupled to transmitter circuitry 138.

In the illustrated embodiment, emitter and collector electrodes of the phototransistors are coupled to the transmitter circuitry 138. Voltage levels across the collector and emitter electrodes are dependent upon the voltage levels of the base electrodes thereof, and the voltage levels at the base electrodes of the transistors 134 are dependent upon energy levels of infrared light energy supplied to the base electrodes of the transistors.

The voltage levels of the signals applied to the transmitter circuitry 138 are dependent, therefore, upon the amount of displacement of the diaphragm 14 caused by application of the acoustic signals 12 thereto.

The transmitter circuitry 138 is operative, in conventional manner, to convert the signals applied thereto by the light receiver 34 into a form to permit their transmission upon a communication channel.

Figure 4:
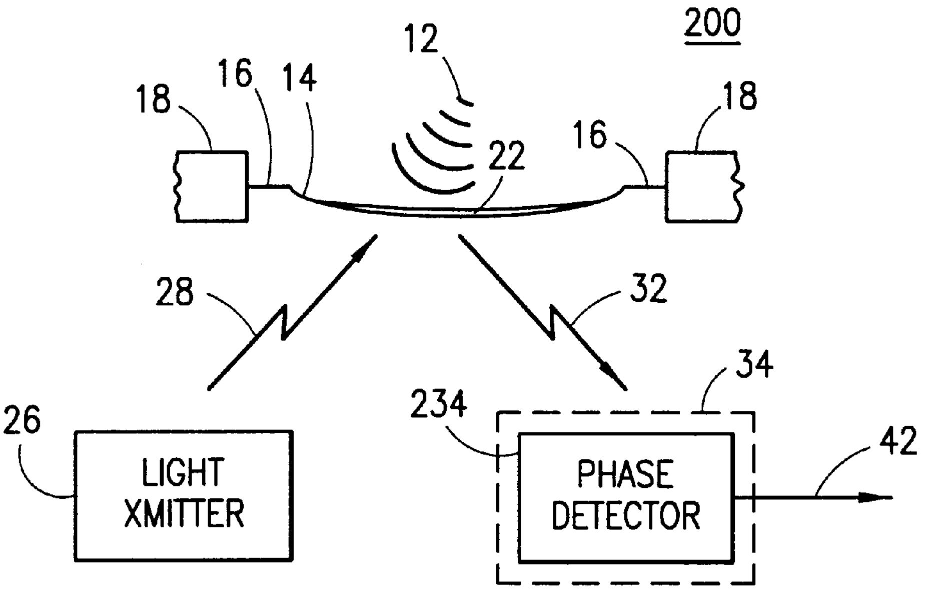
FIG. 4 illustrates a functional, block diagram of the transducer circuitry of another embodiment of the present invention.

FIG. 4 illustrates transducer circuitry, shown generally at 200 of another embodiment of the present invention. The transducer circuitry 200 is also operative to convert an acoustic signal, such as a voice signal, into electrical form, analogous to the transducer circuitry 110 shown in preceding figures. Structure of the transducer circuitry 200 which corresponds to such other circuitry shall again be like-numbered.

Acoustic signals 12 applied to a diaphragm 14 cause displacement of the diaphragm. The diaphragm 14 is supported in position by a bracket 16 which is affixed to fixed supports 18. The amount of displacement of the diaphragm is dependent upon the magnitude of the acoustic signal 12 received at the diaphragm. The diaphragm 14 includes at least a portion thereof, here indicated by portion 22, which is formed of a light-reflective material.

A light transmitter 26 is positioned to direct light energy, here indicated by a light beam 28 toward the reflective portion 22 of the diaphragm 14. The light energy incident upon the reflective portion 22 is reflected therefrom at an angle dependent upon the angle at which the light energy is incident upon the portion 22 and the incident location upon the portion 22 at which the light energy is incident. The reflected light energy, indicated in the figure by a reflected light beam 32 includes a portion which is directed towards a light receiver 34 which in this embodiment includes a phase detector 234.

The phase of the reflected light energy is dependent upon the displacement of the diaphragm 14. That is to say, the phase of the light energy, when detected by the phase detector 234, is dependent upon the incident angle and the incident location of the portion 22 at which the incident light energy strikes the reflective portion 22. The phase detector 234 forming the light receiver 34 generates a signal on line 42 representative of phase changes of the light energy detected by the phase detector. Such signals are representative of the acoustic signals 12. Such signals can be utilized, for instance, by transmitter circuitry to transmit signals representative of the acoustic signals.

Figure 5:
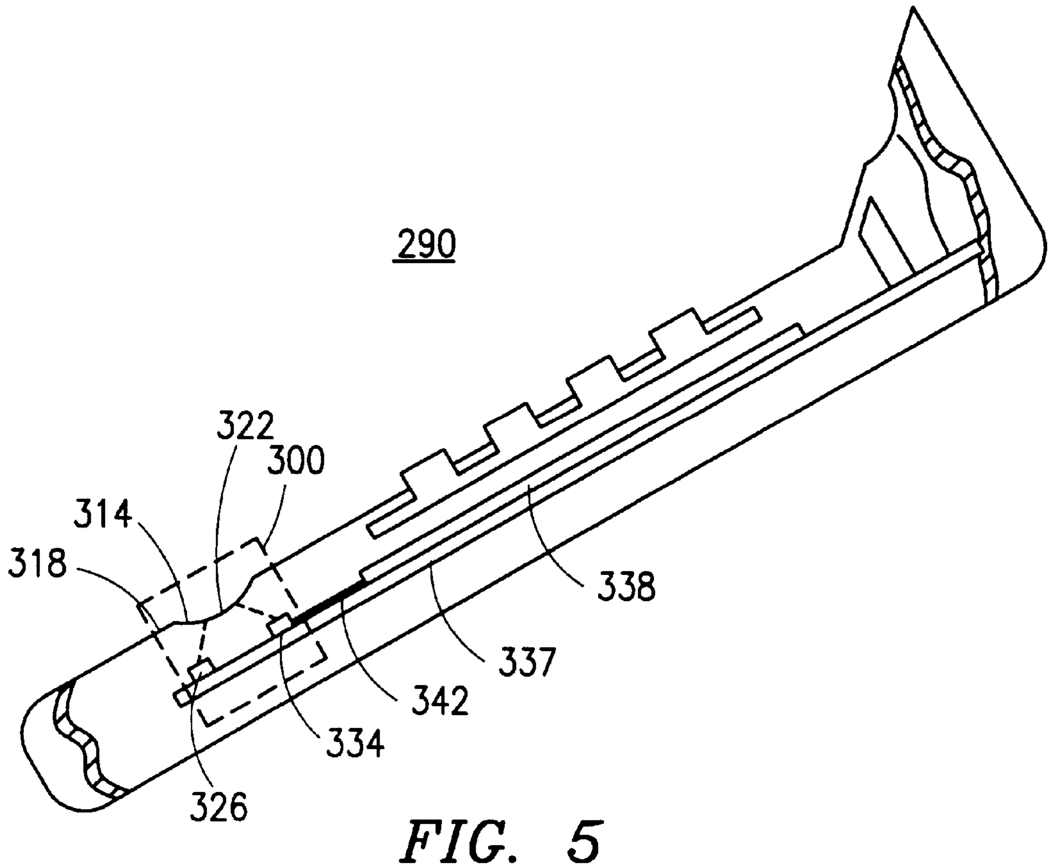
FIG. 5 illustrates a partial cutaway view of a radiotelephonic device including the transducer circuitry shown in FIG. 1 as a portion thereof.

FIG. 5 illustrates a radiotelephone, shown generally at 290 of an embodiment of the present invention. The radiotelephone 290 includes transducer circuitry 303 operable to convert acoustic signals, such as voice signals generated by a speaker speaking into the radiotelephone 290 into electrical form. The transducer circuitry 300 includes a diaphragm 314 which is supported by way of a bracket 316 to a face surface of a radio telephone housing 318. A light transmitter 326 is positioned to transmit infrared light energy toward the diaphragm 314, and a light receiver 334 is positioned to detect light energy reflected off of the reflective portion 322 of the diaphragm. The light receiver 334 generates electrical signals responsive to the detected light energy.

The light transmitter 326 and light receiver 334 are positioned upon a circuit board 337 upon which transceiver circuitry 338 is also mounted. The electrical signals generated by the light receiver 334 are supplied to the transceiver circuitry 338, here indicated by a circuit path 342.

When a user of the radiotelephone 290 speaks into the radiotelephone, the user's voice signals are applied to the diaphragm 314 of the transducer circuitry 300. The diaphragm 314 is displaced responsive thereto. Such displacement affects the characteristics of the light energy reflected off of the reflective portion 322 of the diaphragm 314, and the electrical signals generated by the light receiver 334 are of signal values responsive thereto. In such manner, the user's voice signals are converted into electrical signals which are utilized by the transceiver circuitry 338 to form a transmit signal which is generated by the radiotelephone 290.

Because a light beam is used to detect displacement of an electrical connection with the diaphragm, an electrical winding is not required. When embodied in the telephonic handset, such as a portable radiotelephone, the diaphragm can be positioned to best detect voice signals generated by a user when the user speaks into the phone. As electrical leads extending to the diaphragm are not required to detect displacement of the diaphragm, problems associated with the use of electrical leads extending to the windings of a conventional transducer are avoided.

The previous descriptions are of preferred examples for implementing the invention, and the scope of the invention should not necessarily be limited by this description. The scope of the present invention is defined by the following claims.

What is claimed is:

1. A radiotelephonic device having a first portion, a second portion, and transducer circuitry for converting an acoustic signal into an electrical signal, the radiotelephonic device comprising:

a diaphragm positioned at the first portion to receive the acoustic signal, said diaphragm having a face surface formed of a reflective material, at least the face surface being displaceable by displacement distances responsive to levels of the acoustic signal detected thereat;

a light transmitter positioned at the second portion to direct an incident light beam towards said diaphragm, the incident light beam being incident upon the reflective face surface of said diaphragm at a location thereof and at an angle thereto dependant upon the displacement distances at which said diaphragm is displaced;

a light detector positioned at the second portion to detect a reflected light beam reflected off of said diaphragm, the reflected light beam detected thereat being of characteristics responsive to the location upon which and the angle at which the incident light beam is incident to the face surface of said diaphragm, said light detector generating the electrical signal of values responsive to detected characteristics of the reflected light beam; and wherein the first portion of the radiotelephonic device is at least one of rotatably coupled and slidably connected to the second portion of the radiotelephonic device.

2. The radiotelephonic device of claim 1 wherein said light transmitter comprises an infrared transmitter and wherein the incident light beam comprises an infrared light signal.

3. The radiotelephonic device of claim 2 wherein the reflective material of which the face surface of said diaphragm is formed reflects light of infrared frequencies.

4. The radiotelephonic device of claim 2 wherein said light detector comprises an infrared detector, the infrared detector for detecting infrared light of infrared frequencies corresponding to infrared frequencies of which the infrared light signal generated by the infrared transmitter is formed.

5. The radiotelephonic device of claim 1 wherein said light transmitter comprises a light emitting diode.

6. The radiotelephonic device of claim 1 wherein said light detector comprises a phototransistor.

7. The radiotelephonic device of claim 1 wherein said light detector comprises an array of at least two spaced-apart light detecting elements.

8. The radiotelephonic device of claim 1 wherein the characteristics detected by said light detector comprise phase characteristics of the reflected light beam and wherein said light detector comprises a phase detector for detecting phase changes of the reflected light beam.

9. The radiotelephonic device of claim 1 wherein the characteristics of the reflected light beam detected by said light detector comprise intensity levels of the reflected light beam.

10. The radiotelephonic device of claim 1 wherein the acoustic signal comprises a voice signal generated by an operator of the radiotelephonic device, the second portion of the radiotelephonic device includes a transmitter part, and said diaphragm is mounted at the first portion of the radiotelephonic device to receive the voice signal generated by the operator.

11. The radiotelephonic device of claim 10 wherein the second portion of the radiotelephonic device comprises an earpiece-side portion and the first portion of the radiotelephonic device comprises a microphone-side portion.

12. The radiotelephonic device of claim 10 wherein said light transmitter and said light detector are positioned within at least part of a housing of the radiotelephonic device.

13. The radiotelephonic device of claim 10 wherein the electrical signal generated by said light detector is applied to the transmitter part of the radiotelephonic device.

14. A method for converting an acoustic signal into an electrical signal at a radiotelephonic device having a first portion that is at least one of rotatably coupled and slidably connected to a second portion of the radiotelephonic device, the method comprising the steps of:

positioning a diaphragm at the first portion to receive the acoustic signal, the diaphragm having a face surface formed of a reflective material, at least the face surface of the diaphragm being displaceable by displacement distances responsive to levels of the acoustic signal received thereat;

directing from the second portion an incident light beam towards the diaphragm positioned during said step of positioning, the incident light beam being incident upon the reflective face surface of the diaphragm at a location thereof and at an angle thereto dependent upon the displacement distances at which the diaphragm is displaced;

detecting at the second portion a reflected light beam reflected off the diaphragm to a measuring position, the reflected light beam being of an intensity responsive to the location upon which and the angle at which the incident light beam is incident to the face surface of the diaphragm;

generating at the second portion the electrical signal of values responsive to detected levels of the intensity of the reflected light beam; and at least one of rotating and sliding the first portion with respect to the second portion.

15. The method of claim 14 wherein said step of directing comprises directing pulses of the incident light beam toward the diaphragm.

16. The method of claim 15 wherein the acoustic signal comprises a voice signal generated by an operator of the radiotelephonic device, the second portion having at least a transmitter part, and wherein the method comprises the further step of applying the electrical signal generated during said step of generating to the transmitter part.

17. A radiotelephonic device operable in a radiotelephonic communication system, the radiotelephonic device comprising a first portion and a second portion, each of the first portion and the second portion including at least one part of a microphonic assembly and the second portion also including a transmitter part, the microphonic assembly for converting an acoustic signal applied to the radiotelephonic device into an electrical signal used by the transmitter part to form a transmit signal, the microphonic assembly of the radiotelephonic device comprising:

a diaphragm positioned at the first portion of the radiotelephonic device to receive the acoustic signal, said diaphragm having a face surface formed of a reflective material, at least the face surface being displaceable by displacement distances responsive to levels of the acoustic signal detected thereat;

a light transmitter positioned at the second portion of the radiotelephonic device to direct an incident light beam towards said diaphragm, the incident light beam being incident upon the reflective face surface of said diaphragm at a location thereof and at an angle thereto dependent upon the displacement distances at which said diaphragm is displaced;

a light detector positioned at the second portion of the radiotelephonic device to detect a reflected light beam reflected off of said diaphragm, the reflected light beam detected thereat being of an intensity responsive to the location upon which and the angle at which the incident light beam is incident to the face surface of said diaphragm, said light detector generating the electrical signal of values responsive to detected levels of the intensity of the reflected light beam; and wherein the first portion of the radiotelephonic device is a least one of rotatably coupled and slidably connected to the second portion of the radiotelephonic device.

* * * * *

UNITED STATES PATENT AND TRADEMARK OFFICE
CERTIFICATE OF CORRECTION

PATENT NO : 5,995,260
DATED : November 30, 1999
INVENTOR(S) : Karl W. Rabe

It is certified that error appears in the above-identified patent and that said Letters Patent are hereby corrected as shown below:

| | |
|---|---|
| First Page of Patent<br>last line, first column | Replace "195 08 284"<br>With --195 08 284 A1 1/1996 Germany-- |
| First Page of Patent<br>first line, second column | delete "A1 1/1996 Germany" |
| Column 9, line 13 | Replace "circuitry 303"<br>With --circuitry 300-- |

Signed and Sealed this

Tenth Day of April, 2001

*Attest:*

Nicholas P. Godici

NICHOLAS P. GODICI

*Attesting Officer*

*Acting Director of the United States Patent and Trademark Office*